(12) United States Patent
Park

(10) Patent No.: US 7,914,044 B2
(45) Date of Patent: Mar. 29, 2011

(54) COLLISION ENERGY ABSORBABLE STEERING COLUMN FOR VEHICLE

(75) Inventor: Joo-yeol Park, Wonju (KR)

(73) Assignee: Mando Corporation, Gyeonggi-do (KR)

( * ) Notice: Subject to any disclaimer, the term of this patent is extended or adjusted under 35 U.S.C. 154(b) by 170 days.

(21) Appl. No.: 12/389,009

(22) Filed: Feb. 19, 2009

(65) Prior Publication Data

US 2009/0218801 A1    Sep. 3, 2009

(51) Int. Cl.
  *B62D 1/19*      (2006.01)
(52) U.S. Cl. ........... 280/777; 74/493; 188/371; 280/775
(58) Field of Classification Search ........... 74/493; 188/371, 374; 280/775, 777
  See application file for complete search history.

(56) References Cited

U.S. PATENT DOCUMENTS

| | | | |
|---|---|---|---|
| 4,989,898 A * | 2/1991 | Yamaguchi et al. | 280/777 |
| 5,390,955 A | 2/1995 | Kaliszewski et al. | 280/777 |
| 5,517,877 A * | 5/1996 | Hancock | 74/492 |
| 5,961,146 A * | 10/1999 | Matsumoto et al. | 280/777 |
| 6,183,012 B1 * | 2/2001 | Dufour et al. | 280/777 |
| 6,224,104 B1 * | 5/2001 | Hibino | 280/777 |
| 6,234,528 B1 * | 5/2001 | Ben-Rhouma et al. | 280/777 |
| 6,575,497 B1 * | 6/2003 | McCarthy et al. | 280/777 |
| 6,726,248 B2 * | 4/2004 | Satou et al. | 280/777 |
| 6,761,376 B2 | 7/2004 | Riefe et al. | 280/777 |
| 6,764,098 B2 * | 7/2004 | Matsumoto et al. | 280/777 |
| 6,942,250 B2 * | 9/2005 | Dubay et al. | 280/777 |
| 7,118,131 B2 * | 10/2006 | Manwaring et al. | 280/777 |
| 7,156,420 B2 * | 1/2007 | Ben Rhouma et al. | 280/777 |
| 7,188,867 B2 * | 3/2007 | Gatti et al. | 280/777 |
| 7,219,927 B2 * | 5/2007 | Lee | 280/777 |
| 7,455,320 B2 * | 11/2008 | Imamura et al. | 280/777 |
| 2008/0238071 A1 | 10/2008 | Oh | 280/777 |

FOREIGN PATENT DOCUMENTS

| KR | 2001097007 A | * | 11/2001 |
|---|---|---|---|
| KR | 2002078857 A | * | 10/2002 |
| KR | 2003037418 A | * | 5/2003 |
| KR | 2007005977 A | * | 1/2007 |

* cited by examiner

*Primary Examiner* — Paul N Dickson
*Assistant Examiner* — Laura Freedman
(74) *Attorney, Agent, or Firm* — McDermott Will & Emery LLP

(57) ABSTRACT

Disclosed is a vehicular collision energy absorbable steering column coupled to a steering shaft. The steering column comprises shaped wires deformable to absorb a collision load in a vehicle collision, a cylindrical hollow outer tube, a cylindrical hollow inner tube having on its interior circumferential surface mounting grooves to secure the wires, and a distance bracket that is formed of a hollow tubular member having an outer tube joint at one end and an inner tube joint at the opposite end and has a pair of fastening flanges shaped into two spaced opposing plates formed on the outer circumferential surfaces of the tubular member for receiving the wires so that the distance bracket may collapse in the axial direction in the event of a vehicle collision through deforming the wires.

3 Claims, 4 Drawing Sheets

COLLISION ENERGY ABSORBABLE STEERING COLUMN FOR VEHICLE

CROSS-REFERENCE TO RELATED APPLICATION

This non-provisional application claims priority under 35 U.S.C §119(a) on Patent Application No. 10-2008-0018936 filed in Korea on Feb. 29, 2008, the entire contents of which are hereby incorporated by reference.

TECHNICAL FIELD

The present invention relates to vehicle steering columns. More particularly, the present invention relates to a collision energy absorbable steering column that can collapse in the same direction as an accidental vehicle collision load to readily absorb the collision energy by employing an impact absorbing wire simplicity to structurally reduce both the manufacturing cost and assembling steps. Additionally, the present steering column avoids interferences between adjacent components and thus an unbalanced collision load therefrom.

BACKGROUND OF THE DISCLOSURE

Generally, a steering column is structured to envelope a steering shaft, which transmits driver's steering wheel rotations to a rack and pinion mechanism. Thus, the steering column supports rotations of the steering shaft as it secures the position of the steering shaft through a bracket mounted to a vehicle body portion.

Such a steering column is presently equipped with a collision energy absorbable mechanism that provides an extra function of collapsing at both the steering column and steering shaft in response to an accidental vehicle collision in order to prevent the driver from receiving a severe injury from striking the steering wheel. This is based on the fact that in a vehicle collision during operation the driver's upper body hits the steering wheel of the vehicle interior following the law of inertia. As the driver impacts the steering wheel, the underside steering column and steering shaft yield and collapse to help reduce the impact onto the driver. However, depending on the conditions of the driver and vehicle the impact of the driver must act differently on the steering wheel. For example, the impact may be high or low proportional to the corresponding vehicle speed. In addition, whether the driver has bucked up with the safety belt and air bags deployed or not will affect the impact onto the steering wheel. In order to handle this situation better, a steering system equipped with a tearing plate has been developed.

FIG. 1 is a brief side elevational view of a conventional collision energy absorbable steering column 100. As illustrated, conventional column 100 comprises a steering shaft 102 having an upper end connected to a steering wheel (not shown) and a lower end connected to a rack and pinion mechanism (not shown), an inner tube 110 enveloping steering shaft 102, an outer tube 120 over inner tube 110, an upper bracket 130 for supporting outer tube 120 at its periphery surface while being secured to a vehicle body 104 through a capsule 140, and a tearing plate 170 having one end fixed to capsule 140 by a fastening means 150 and the opposite end fixed to upper bracket 130 by a fastening means 160.

With this type of steering column 100, in case of a frontal vehicle collision the driver's upper body may impact the steering wheel to collapse it in the same direction as the impacting course, whereby upper bracket 130 is adapted to shift from capsule 140 on vehicle body 104 along with outer tube 120 in that collapsing direction. Specifically, upon receiving the collision effect upper bracket 130 is detached from capsule 140 breaking easy off the vehicle body 104. Thereby, moving in the impacting and thus collapsing direction the steering column 100 telescopically collapses.

In addition, when steering column 100 contracts to shift upper bracket 130 downwardly relative to the fixed capsule 140 the tearing plate 170 will be subjected to opposing forces of capsule 140 and upper bracket 130.

Thus, a tearing groove formed on tearing plate 170 breaks along the upper bracket 130 shift to absorb the impact. I.e., fastening means 160 installed on upper bracket 130 deforms the tearing plate 170 in order to absorb the collision energy.

However, this method of absorbing the collision load by the capsule on the upper bracket or the tearing plate is susceptible to difficulty in absorbing the collision energy due to the convenience tilting option generally exercised resulting in the collision absorption correspondingly angled with respective to the collapsing direction. Furthermore, a high number of components added to the increase of assembling processes and the cost for manufacturing the conventional steering columns. Also, there have been customary problems of interferences between adjacent components and thus an unbalanced collision load to handle therefrom.

DISCLOSURE OF THE INVENTION

In order to solve the above problems, the present disclosure seeks to provide a vehicular collision energy absorbable steering column which has a collapsing direction coincidental with the collision load absorption in a vehicle collision to facilitate the absorption of the collision energy and incorporates a simple wire deformation for absorbing the impact, thereby significantly reducing the manufacturing cost and processes as well as interferences between surrounding components and thus an unbalanced collision load to handle.

One embodiment of the present invention provides a vehicular collision energy absorbable steering column coupled to a steering shaft. The steering column comprises a cylindrical hollow outer tube; a cylindrical hollow inner tube having on its interior circumferential surface one or more mounting grooves; and a distance bracket shaped into a hollow cylinder with a circumferential area cut partially open in the axial direction of the steering shaft, the distance bracket having one end fixedly inserted in the outer tube; an opposite end fixedly receiving the inner tube; and a pair of fastening flanges formed with a distance from each other on outer circumferential surfaces of the hollow cylinder, the fastening flanges having grip holes and guide sections with guide grooves; and one or more U-shaped wires each having two ends, wherein one of the ends is fixed on the mounting groove of the inner tube and the other end is extended from the circumferential area cut, penetrated through the grip holes in the axial direction and seated in the guide grooves, so that the one or more wires are deformed in the axial direction with the vehicle load in the vehicle collision in order to cushion the vehicle collision.

The vehicular collision energy absorbable steering column according to the present disclosure has a collapsing direction coincidental with the collision load absorption in a vehicle collision to facilitate the absorption of the collision energy and incorporates a simple wire deformation for absorbing the impact, thereby significantly reducing the manufacturing cost and processes as well as interferences between surrounding components and thus an unbalanced collision load to handle.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
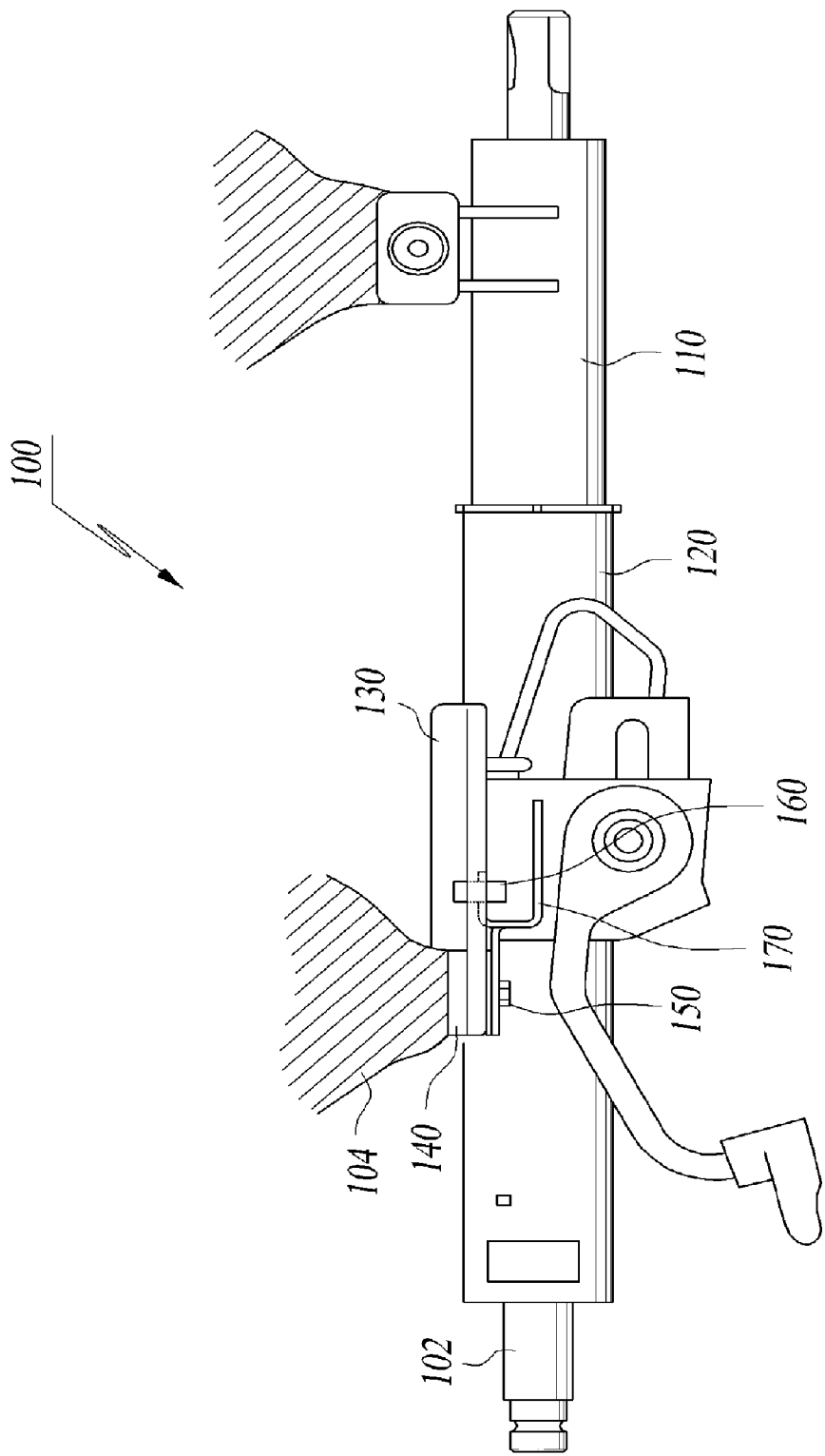
FIG. 1 is a simplified side elevational view of a collision energy absorbable steering column for vehicles according to a conventional technology.

Hereinafter, an exemplary embodiment of the present disclosure will be described with reference to the accompanying drawings. In the following description, the same elements will be designated by the same reference numerals although they are shown in different drawings.

Further, in the following description of the present disclosure, a detailed description of known functions and configurations incorporated herein will be omitted when it may make the subject matter of the present disclosure rather unclear.

Figure 2:
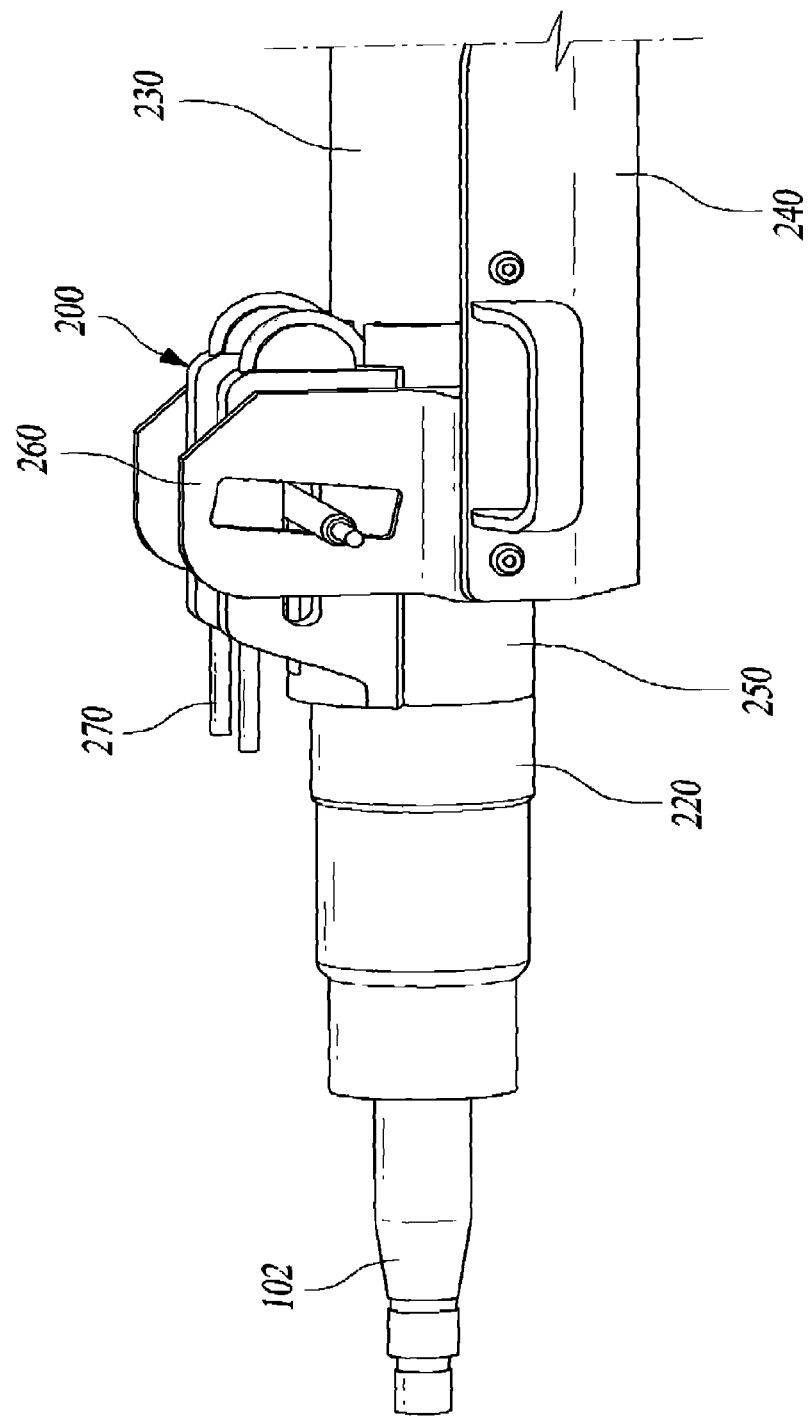
FIG. 2 is a fragmentary perspective view of a collision energy absorbable steering column for vehicles according to an embodiment of the present invention.
Figure 3:
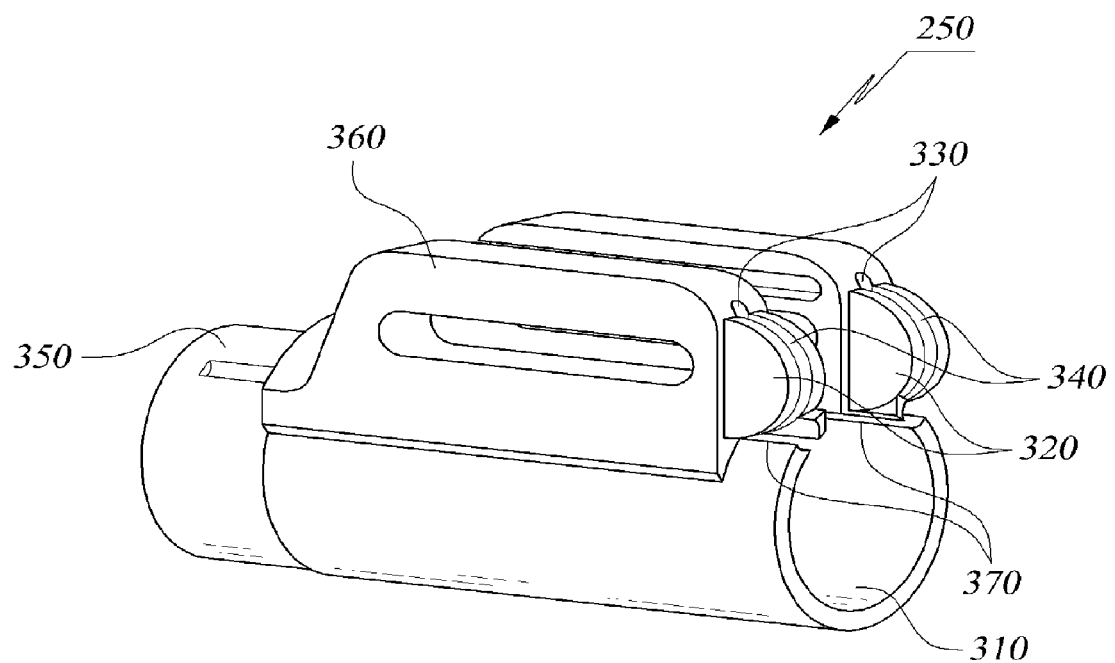
FIG. 3 is a perspective view of a distance bracket of a collision energy absorbable steering column according to an embodiment of the present invention.

FIG. 2 is a fragmentary perspective view of a collision energy absorbable steering column for vehicles according to an embodiment of the present disclosure; FIG. 3 is a perspective view of a distance bracket of a collision energy absorbable steering column according to an embodiment of the present disclosure; and FIG. 4 is a perspective view of wires fixed to an inner tube of a collision energy absorbable steering column according to an embodiment of the present disclosure.

Figure 4:
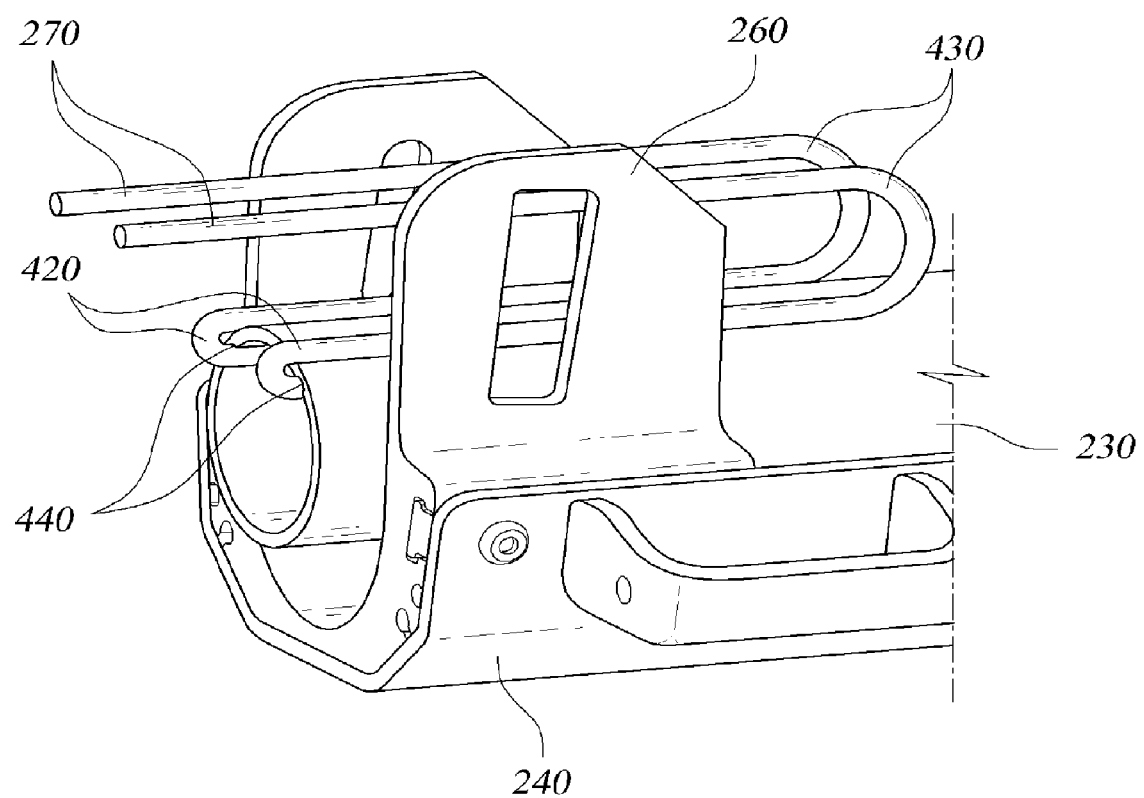
FIG. 4 is a perspective view of wires fixed to an inner tube of a collision energy absorbable steering column according to an embodiment of the present invention.

As shown in FIGS. 2-4, a collision energy absorbable steering column 200 according to an embodiment of the present disclosure comprises a hollow outer tube 220 that may be collapsed together with a distance bracket 250 along steering shaft 102 in response to an event of a vehicle collision; and a hollow inner tube 230 having on its interior surface mounting grooves 410 formed to secure wires 270. The distance bracket 250, which is formed of a hollow tubular member having an outer tube joint 350 fixedly inserted into outer tube 220 at one end and an inner tube joint 310 for fixedly receiving inner tube 230 at the opposite end, has a pair of fastening flanges 360 shaped into two spaced opposing plates formed on the outer circumferential surfaces of the tubular member so that the wires 270 secured to inner tube 230 are connected to fastening flange 360 until distance bracket 250 collapses deforming wires 270 along steering shaft 102 at the collision. Each wire 270 has one side secured to inner tube 230 and the other side connected to distance bracket 250 so that it yields to the collision force of the vehicle to absorb the collision load.

Distance bracket 250 that is supported by plate bracket 260 secured to mounting bracket 240 fixed in turn to the vehicle body will collapse at the collision together with outer tube 220 along with steering shaft 102. When the collapsing occurs with reference to the stationary inner tube 230, the steering column assembly is structured to deform wires 270 to absorb the collision energy.

The distance bracket 250 is formed into an open hollow tubular member with a circumferential section axially cut out and is adapted to be fixedly inserted into outer tube 220 at the outer tube joint 350 and fixedly receive inner tube 230 at its inner tube joint 310.

Circumferentially of distance bracket 250 the fastening flange 360 is formed as a pair of spaced opposing plates to which wires 270 are connected so that in the event of the vehicle collision wires 270 may deform allowing steering column 200 to collapse in the axial direction of steering shaft 102.

More specifically, the fastening flange 360 has at its distal side near inner tube joint 310 (towards the collapsing direction) a couple of semicircular guide plates 320. Between the opposing side walls of each guide plate 320 is formed a central guide groove 340 with a circular profile in cross section. And, at the upper end of a guide groove 340 joining fastening flange 360 there is formed a grip hole 330, which extends through the length of fastening flange 360 in the axial direction of steering shaft 102.

Therefore, the wires 270 form parallel straight ends which are fixedly inserted in both the guide grooves 340 and grip holes 330 may receive the vehicle collision load as the wire ends bend about guide grooves 340 allowing steering column 200 to collapse in the axial direction of steering shaft 102.

The fact that the impact absorption proceeds in the same direction as the collapsing direction of the outer and inner tubes 220, 230 adds to the increased efficiency in absorbing the collision impact.

In addition, distance bracket 250 has slit holes 370 formed in between the axially cut edges and the outer circumferential surfaces on which fastening flange 360 is formed. Thus, when distance bracket 250 (FIG. 3) and inner tube 230 (FIG. 4) are assembled, the previously secured wires 270 on inner tube 230 may penetrate slit holes 370 into secured positions in distance bracket 250.

Referring to FIG. 4, wires 270 may be comprised of the parallel straight end sections to be inserted in grip holes 330, a couple of impact absorption sections 430 bent to rest in guide grooves 340, a couple of attachment sections 420 which are formed integral to impact absorption sections 430 and bent over the edge of inner tube 230 to be seated in the contoured mounting grooves 440 formed on the interior circumferential surfaces of inner tube 230.

I.e., each wire 270 may be formed to have double bends one at impact absorption section 430 and the other at attachment section 420. The attachment sections 420 may be bent to tightly clamp inner tube 230 by its outer circumferential surfaces and mounting grooves 440 where attachment sections 420 may be welded to inner tube 230.

Therefore, upon fixture to mounting groove 440 of inner tube 230 wires 270 will be ready to absorb a vehicle collision impact, which will act to collapse distance bracket 250 axially of steering shaft 102 so that guide plates 320 of bracket 250 bear against impact absorption sections 430 of wires 270 seated in guide grooves 340 forcing sections 430 to unbend.

In the drawings and description of the present disclosure, a doubled configuration has been illustrated and explained with regards to the wire form and the corresponding grip holes, guide grooves, guide plates and mounting grooves although it is not intended to limit the disclosure but a singular or other wire form may achieve the purpose of the present disclosure.

With the collision energy absorbable steering column 200 so constructed and shaped by the present disclosure, at the event of a vehicle collision, the collision load absorption is coincidental with its collapsing direction to facilitate the absorption of the collision energy, a simple wire deformation for absorbing the impact significantly reduces manufacturing cost and processes as well as interferences between surrounding components and thus an unbalanced collision load to handle.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. A vehicular collision energy absorbable steering column coupled to a steering shaft, the steering column comprising:
    a cylindrical hollow outer tube;
    a cylindrical hollow inner tube having on an interior circumferential surface one or more mounting grooves; and
    a distance bracket shaped into a hollow cylinder with a circumferential area cut partially open in an axial direction of the steering shaft, the distance bracket having one end fixedly inserted in the outer tube;
    an opposite end fixedly receiving the inner tube; and
    a pair of fastening flanges formed with a distance from each other on outer circumferential surfaces of the hollow cylinder, the fastening flanges having grip holes and guide sections with guide grooves; and
    one or more U-shaped wires each having two ends, wherein one of the ends is fixed on the mounting groove of the inner tube and the other end is extended from the circumferential area cut, penetrated through the grip holes in the axial direction and seated in the guide grooves, so that the one or more wires are deformed in the axial direction with a vehicle load in the vehicle collision in order to cushion the vehicle collision.

2. The vehicular collision energy absorbable steering column in claim 1, wherein each of the guide sections is in planar semicircular shape along which the guide groove is formed centrally with a circular profile in cross section.

3. The vehicular collision energy absorbable steering column in claim 1, wherein the wire is comprised of a straight end section to be inserted in the grip hole, an impact absorption section extending from the straight end section and bent to rest in the guide groove, an attachment section formed integral to the impact absorption section and bent over the inner tube and extending through a straight length to be seated in the mounting groove formed on the interior circumferential surfaces of the inner tube.

* * * * *

UNITED STATES PATENT AND TRADEMARK OFFICE
CERTIFICATE OF CORRECTION

PATENT NO. : 7,914,044 B2  Page 1 of 1
APPLICATION NO. : 12/389009
DATED : March 29, 2011
INVENTOR(S) : Joo-yeol Park It is certified that error appears in the above-identified patent and that said Letters Patent is hereby corrected as shown below:

Insert on Cover Page

--(30)  Foreign Application Priority Data

February 29, 2008   (KR).........................................................10-2008-0018936--

Signed and Sealed this
Tenth Day of May, 2011

David J. Kappos
*Director of the United States Patent and Trademark Office*